March 29, 1938.  H. WEBER  2,112,722
CONTROL DEVICE
Filed Nov. 2, 1936
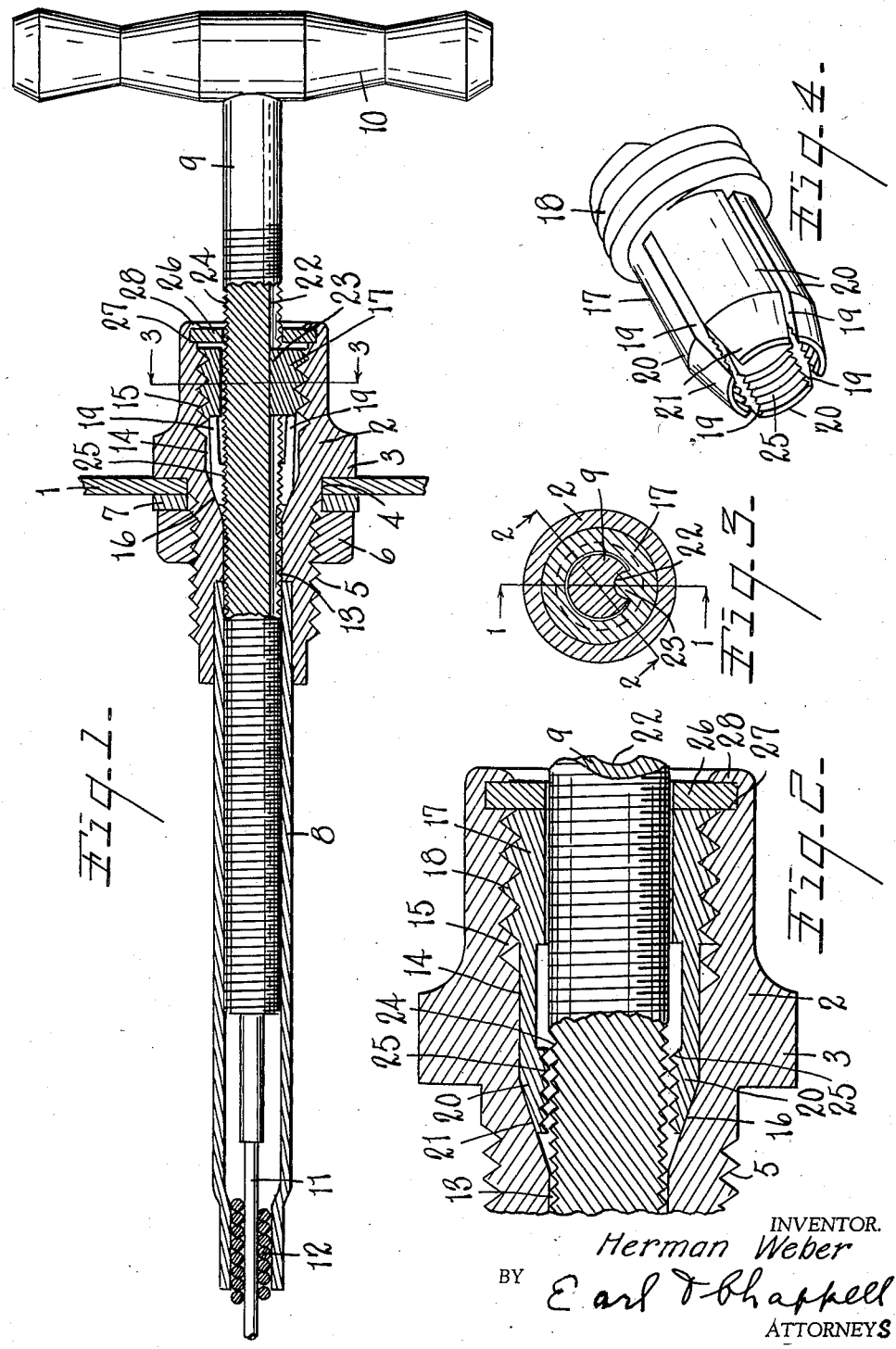
INVENTOR.
Herman Weber
BY Earl T Chappell
ATTORNEYS Patented Mar. 29, 1938

2,112,722

UNITED STATES PATENT OFFICE 2,112,722

CONTROL DEVICE

Herman Weber, Kalamazoo, Mich., assignor to Shakespeare Products Company, Kalamazoo, Mich.

Application November 2, 1936, Serial No. 108,911

8 Claims. (Cl. 74—502)

The main object of this invention is to provide a control device which is well adapted for the adjusting or controlling of throttles of airplane, automobile and like engines, the control rod or member being locked and securely held in any of its adjusted positions.

A further object is to provide a control device having these advantages which is very convenient to manipulate, at the same time simple and economical in its parts, and strong and durable.

Objects relating to details and economies of the invention will appear from the description to follow. The invention is defined and pointed out in the claims.

A structure which is a preferred embodiment of the invention is illustrated in the accompanying drawing, in which:

Fig. 1 is a fragmentary view mainly in central longitudinal section on line 1—1 of Fig. 3 of my improved control device with the parts in position for locking the control member or rod.

Fig. 2 is an enlarged detail view mainly in longitudinal section on line 2—2 of Fig. 3.

Fig. 3 is a transverse section on line 3—3 of Fig. 1.

Fig. 4 is a perspective view of the locking member or collet.

In the embodiment of my invention illustrated, 1 represents the instrument board of an airplane or an automobile. My control device comprises a tubular body or support 2 having an annular flange 3 abutting the instrument board when the support is inserted in a hole 4 provided therefor in the instrument board. The support is externally threaded at 5 to receive the retaining nut 6. A lock washer is indicated at 7.

The support illustrated is made of two parts, the body proper having a tubular extension 8. This support is adapted to receive and rotatably and slidably support the control member or control rod 9 which has a cross handle or other suitable grip 10 at its outer end and is connected at its inner end to the flexible transmission wire or element 11 housed within the flexible wire tube 12 which supports it and prevents kinking under thrust as is well understood in this art.

The support has a longitudinal bore 13 receiving the control rod and this bore has an enlargement 14 at its outer end, the outer portion of the enlargement being internally threaded as at 15, the inner portion of the enlargement being inwardly tapered as shown at 16.

The collet or clamping member 17 is threaded into the support, it having threads 18 coacting with the threads 15. The collet is longitudinally slotted at 19 to provide a plurality of spring or yieldable jaws 20. The inner ends of these jaws are tapered at 21 to coact with the taper 16 of the support so that when the collet is rotated to force it inwardly, these inclined and tapered surfaces 21 coming into engagement with the inclined surface 16 force the jaws into clamping engagement with the control member.

To actuate the collet for clamping and releasing positions, it is provided with a splined engagement with the control rod, the control rod having a longitudinal groove 22 while the collet is provided with a feather 23 engaging the groove so that by manually rotating the rod, the collet may be engaged and disengaged and when in disengaged position, the rod may be freely moved longitudinally.

The control rod is provided with external threads 24 extending throughout a substantial portion of its length. The jaws have internal threads 25 coacting with the threads of the control rod when the jaws are in actuated position. It should be understood, however, that these threads are not primarily intended to cooperate as threads but to cooperate as teeth or serrations for insuring a very secure engagement without necessitating a severe clamping action and holding the parts effectively even though they may become smooth with use or collect a film of oil or other material that would tend to cause slippage.

The closure disk 26 is seated in the outer end of the support against a shoulder 27 provided therefor and a portion of the metal of the support is spun over at 28 to retain the disk. This not only serves as a closure but also serves as a stop limiting the outward movement of the collet. The movement necessitated is not great but should be sufficient to completely release the jaws of the collet.

With this arrangement of parts, the control may be very accurately adjusted and effectively secured in its adjusted positions. There are relatively few parts and these are of a simple character which can be quite economically produced.

The device is well adapted for use on various types of engines, stationary, automobile, and flying machine, and is particularly desirable where a plurality of engines are employed as is frequently the case in flying machines or airplanes inasmuch as the throttle, for example, can be accurately adjusted and secured in its adjusted positions. It is also of advantage when employed on a choke as the choke may be held in any position of adjustment until released or readjusted.

I have illustrated and described my improvements in an embodiment which I consider very practical. I have not attempted to illustrate or describe certain modifications and adaptations which I contemplate as it is believed that this disclosure will enable those skilled in the art to readily adapt my improvements to various installations.

Having thus described my invention, what I claim as new and desire to secure by Letters Patent, is:

1. In a control device of the character set forth, the combination of a support provided with a longitudinal bore having an enlargement at its outer end, the enlargement having an inwardly tapered portion at its inner end, the outer portion of the enlargement being internally threaded, a threaded manual control rod slidably and rotatably supported by said support, and a collet having an external threaded portion at its outer end coacting with the said threads of said support, the inner end of said collet being longitudinally slit providing clampings jaws, the clamping jaws being tapered at their inner ends to coact with said inwardly tapered portion of said support, said jaws having internal screw threads at their inner ends engaging the threads of said rod when the collet is engaged, the rod and collet having splined engagement whereby the collet may be rotated to engage and disengage the jaws by the rotation of the rod and the rod may be longitudinally adjusted when the jaws are disengaged.

2. In a control device of the character set forth, the combination of a support provided with a longitudinal bore having an enlargement at its outer end, the enlargement having an internally threaded outer portion and an inwardly tapered inner portion, a toothed manual control rod slidably engaging and rotatable in said support, and a collet having an external threaded portion at its outer end coacting with the said threads of said support and having inwardly projecting spring clamping jaws tapered at their inner ends to coact with said inwardly tapered portion of said support, said jaws having internal teeth engaging the teeth of said rod when the collet is engaged, the rod and collet having splined engagement whereby the collet may be actuated to engage and disengage the jaws by the rotation of the rod and the rod may be longitudinally adjusted when the jaws are disengaged.

3. In a control device of the character set forth, the combination of a support provided with a longitudinal bore having an enlargement at its outer end, the enlargement having an internally threaded outer portion and an inwardly tapered inner portion, a toothed manual control rod slidably engaging and rotatable in said support, and a collet having an external threaded portion at its outer end coacting with the said threads of said support and having inwardly projecting spring clamping jaws tapered at their inner ends to coact with said inwardly tapered portion of said support, the rod and collet having splined engagement whereby the collet may be actuated to engage and disengage the jaws by the rotation of the rod and the rod may be longitudinally adjusted when the jaws are disengaged.

4. In a control device of the character set forth, the combination of a support provided with a longitudinal bore having an enlargement at its outer end, the enlargement having an internally threaded outer portion and an inwardly tapered inner portion, a toothed manual control rod slidably engaging and rotatable in said support, a collet having an external threaded portion at its outer end coacting with the said threads of said support and having inwardly projecting spring clamping jaws tapered at their inner ends to coact with said inwardly tapered portion of said support, the rod and collet having splined engagement whereby the collet may be actuated to engage and disengage the jaws by the rotation of the rod and the rod may be longitudinally adjusted when the jaws are disengaged, and a closure for the outer end of said support constituting a stop limiting the outward movement of said collet.

5. In a control device of the character set forth, the combination of a tubular support having an enlarged chamber at its outer end, the enlargement having an internally threaded outer portion and an inwardly tapered inner portion, a toothed manual control rod slidably and rotatably supported in said support, a collet having threaded engagement with the threaded portion of said support and having splined engagement with said control rod whereby the collet may be rotated by the rotation of the rod, said collet having internally toothed inwardly tapered jaws coacting with the inwardly tapered portion of said support, and a closure for the outer end of said support constituting a stop limiting the outward movement of said collet.

6. In a control device of the character set forth, the combination of a tubular support having an enlarged chamber at its outer end, the enlargement having an internally threaded outer portion and an inwardly tapered inner portion, a toothed manual control rod slidably and rotatably supported in said support, and a collet having threaded engagement with the threaded portion of said support and having splined engagement with said control rod whereby the collet may be rotated by the rotation of the rod, said collet having internally toothed inwardly tapered jaws coacting with the inwardly tapered portion of said support.

7. In a control device of the character set forth, the combination of a tubular support having a threaded portion and an inwardly tapered portion adjacent thereto, a threaded manual control rod slidably and rotatably supported in said support, a collet having threaded engagement with the threaded portion of said support and having splined engagement with said control rod whereby the collet may be rotated by the rotation of the rod, said collet having internally threaded inwardly tapered jaws coacting with the inwardly tapered portion of said support, and a closure for the outer end of said support constituting a stop limiting the outward movement of said collet.

8. In a control device of the character set forth, the combination of a tubular support having a threaded portion and an inwardly tapered portion adjacent thereto, a threaded manual control rod slidably and rotatably supported in said support, and a collet having threaded engagement with the threaded portion of said support and having splined engagement with said control rod whereby the collet may be rotated by the rotation of the rod, said collet having internally threaded inwardly tapered jaws coacting with the inwardly tapered portion of said support.

HERMAN WEBER.